(12) United States Patent
Gaillard-Groleas et al.

(10) Patent No.: US 12,704,371 B2
(45) Date of Patent: Aug. 11, 2026

(54) CHROMATIC CONFOCAL MEASUREMENT DEVICE COMPRISING A CAMERA

(71) Applicant: SCIENCES ET TECHNIQUES INDUSTRIELLES DE LA LUMIERE, Aix-en-Provence (FR)

(72) Inventors: Jérôme Gaillard-Groleas, Aix en Provence (FR); Sébastien Gerand, Marignane (FR); Gabrielle Moussu, Vitrolles (FR)

(73) Assignee: SCIENCES ET TECHNIQUES INDUSTRIELLES DE LA LUMIERE, Aix-en-Provence (FR)

( * ) Notice: Subject to any disclaimer, the term of this patent is extended or adjusted under 35 U.S.C. 154(b) by 86 days.

(21) Appl. No.: 18/864,740

(22) PCT Filed: May 19, 2023

(86) PCT No.: PCT/FR2023/050718
§ 371 (c)(1),
(2) Date: Nov. 11, 2024

(87) PCT Pub. No.: WO2023/222987
PCT Pub. Date: Nov. 23, 2023

(65) Prior Publication Data

US 2025/0314476 A1 Oct. 9, 2025

(30) Foreign Application Priority Data

May 19, 2022 (FR) ...................................... 2204770

(51) Int. Cl.
*G01B 11/06* (2006.01)

(52) U.S. Cl.
CPC ...... *G01B 11/0608* (2013.01); *G01B 2210/50* (2013.01)

(58) Field of Classification Search
CPC ................................................ G01B 2210/50
See application file for complete search history.

(56) References Cited

U.S. PATENT DOCUMENTS

2006/0109483 A1 5/2006 Marx
2015/0355101 A1* 12/2015 Sun ........................ G06T 7/586 348/46

(Continued)

FOREIGN PATENT DOCUMENTS

CN 114200658 A * 3/2022 ............ H04N 23/56
EP 3940336 A1 1/2022

OTHER PUBLICATIONS

French Search Report in related French Application No. FR 907661, mailed Dec. 14, 2022.

(Continued)

*Primary Examiner* — Rufus L Phillips
(74) *Attorney, Agent, or Firm* — Thomas | Horstemeyer, LLP

(57) ABSTRACT

The present application relates to a chromatic confocal measurement device (1) comprising: —a light pen (4) comprising a lens (5) with axial chromatism, said light pen being configured to apply a light beam (3) to a surface (6), the light pen (4) having an input end (10) connected to a light source (2), and an output end (11) configured to be placed close to the surface (6); and—a camera (7) attached close to the output end (11) of the light pen (4), such that a portion of the light beam (3) originating from the light source (2) and emerging from the lens (5) with axial chromatism is blocked by the camera (7) at the output end (11) of the light pen (4), and such that another portion of the light beam (3) circumvents the camera (7) and reaches the surface (6).

13 Claims, 5 Drawing Sheets

(56) References Cited

U.S. PATENT DOCUMENTS

| | | | | |
|---|---|---|---|---|
| 2017/0010096 | A1 | 1/2017 | Xie | |
| 2018/0113027 | A1* | 4/2018 | Kubo | G01J 3/502 |
| 2023/0032656 | A1* | 2/2023 | Laman | G01B 11/026 |

OTHER PUBLICATIONS

PCT Search Report in related PCT application No. PCT/FR2023/050718.

* cited by examiner

CHROMATIC CONFOCAL MEASUREMENT DEVICE COMPRISING A CAMERA

CROSS REFERENCE TO RELATED APPLICATIONS

This application is the 35 U.S.C. § 371 national stage application of PCT Application No. PCT/FR2023/050718, filed May 19, 2023, which application claims the benefit of French Application No. FR 2204770 filed May 19, 2022, both of which are hereby incorporated by reference herein in their entireties.

TECHNICAL FIELD

The present application relates in general to the field of inspection and optical control of a part, and more precisely to the measurement of a height and/or a point orientation of a surface of a sample using an optical device.

BACKGROUND

Currently optical comparator measurement devices exist comprising a light pen that can measure the height, thickness and/or local orientation of a surface of a sample, at a point and without contact. The diameter of the light beam at the surface of the sample (generally designated by the term "spot") is generally between 1.5 μm and 50 μm, depending on the objective chosen.

Such comparators can, in particular, be based on the principle of chromatic confocal coding, wherein a light, which is generally polychromatic, is focused on the surface to be studied by a light pen comprising an objective with axial chromatism. The spectral distribution of the light beam is then analysed in order to determine the wavelength of the light source for which a clear image is obtained on the surface, which enables the distance between the objective and the surface to be deduced.

Some of these optical comparators require being able to visualise the measurement point on the surface of the sample to be studied. However, when the measurement is carried out with a chromatic confocal objective, the measurement point is materialised by a very small luminous spot which, moreover, may not be visible depending on the type of surface to be measured. Furthermore, the surface to be studied is itself very small and may require optical assistance in order to correctly position the measurement spot at the desired location on the surface.

It has therefore been proposed to use cameras in order to correctly position the light pen with respect to the surface to be studied. For example, it has been proposed to mount the light pen and the camera on a robot configured in order to successively place the camera and then the light pen above the surface to be studied, in order to adjust the position of the light pen with respect to the surface. However, this solution requires a motorised measurement station, which implies a significant cost and drastically increases the size of the installation.

It has also been proposed to place the camera on the side of the light pen. However, in the case of rough surfaces, the measurement zone may be masked by reliefs.

Finally, it has been proposed to deflect a portion of the optical beam, using a separator cube placed between the light source and the objective, towards a camera placed close to the light pen. However, the image obtained through the chromatic confocal objective is only clear for a given wavelength which corresponds to the wavelength focused on the surface to be measured. Moreover, since light pens are optimised at the centre of the field, the image obtained comprises significant aberrations which make it difficult to exploit the image. In addition, the system is bulky and expensive.

SUMMARY

An object of the present application is therefore to propose a measurement device, for example for measuring a height and/or a thickness of a surface of a sample, making it possible to visualise, in a simple, effective and precise manner, the measurement point on the surface to be studied, which measurement device is of reasonable cost and size.

For this purpose, a first aspect proposes a chromatic confocal measurement device of a parameter of a surface of a sample, the device comprising:

- a light source configured to generate a light beam;
- a light pen comprising an objective with axial chromatism configured to apply the light beam on the surface of the sample, the light pen having an input end connected to the light source and an output end configured to be placed close to the surface of the sample; and
- a camera fixed close to the output end of the light pen, between the objective with axial chromatism and the surface of the sample, such that a portion of the light beam originating from the light source and emerging from the objective with axial chromatism is blocked by the camera at the output end of the light pen and such that another portion of the light beam bypasses the camera and reaches the surface of the sample.

Some preferred, but non-limiting, features of the measurement device are the following, taken individually or in combination:

- the light pen comprises a lens placed close to the output end of the light pen, a first area, corresponding to the orthogonal projection of the lens in a first plane which is perpendicular to an axis of propagation of the light beam through the lens, being larger than a second area, corresponding to the orthogonal projection of the camera in the first plane, such that the camera only partially blocks the optical field of the lens;
- the first area is at least two times larger than the second area, preferably at least four times larger;
- a through-passage is formed in the lens and the camera is at least partially housed in the through-passage;
- the present lens has an axial chromatism and forms a portion of the objective with axial chromatism;
- the lens is achromatic and is placed between the objective with axial chromatism and the camera, a through-passage being formed in the achromatic lens and the camera being at least partially housed in the through-passage;
- the camera is placed between the light pen and the surface to be measured;
- the measurement device further comprises an additional camera, fixed close to the output end of the light pen, between the objective with axial chromatism and the surface of the sample, such that a portion of the light beam originating from the light source and emerging from the objective with axial chromatism, is likewise blocked by the additional camera at the output end of the light pen and such that the other portion of the light beam likewise bypasses the additional camera and reaches the surface of the sample;
- a depth of field of the camera is between 2 mm and 100 mm;

the measurement device further comprises a light fixed on the light pen and configured to illuminate the surface of the sample;

the light is incorporated in the camera or is attached and fixed on the light pen close to the output end; and/or the measurement device further comprises a spectral analysis system configured to determine a spectral distribution of the light beam reflected by the surface of the sample.

BRIEF DESCRIPTION OF THE FIGURES

Other features, goals and advantages will become more apparent on reading the following detailed description, with reference to the attached drawings, given by way of non-limiting examples and in which.

In all the figures, similar elements have identical reference signs.

DETAILED DESCRIPTION OF AN EMBODIMENT

Figure 1:
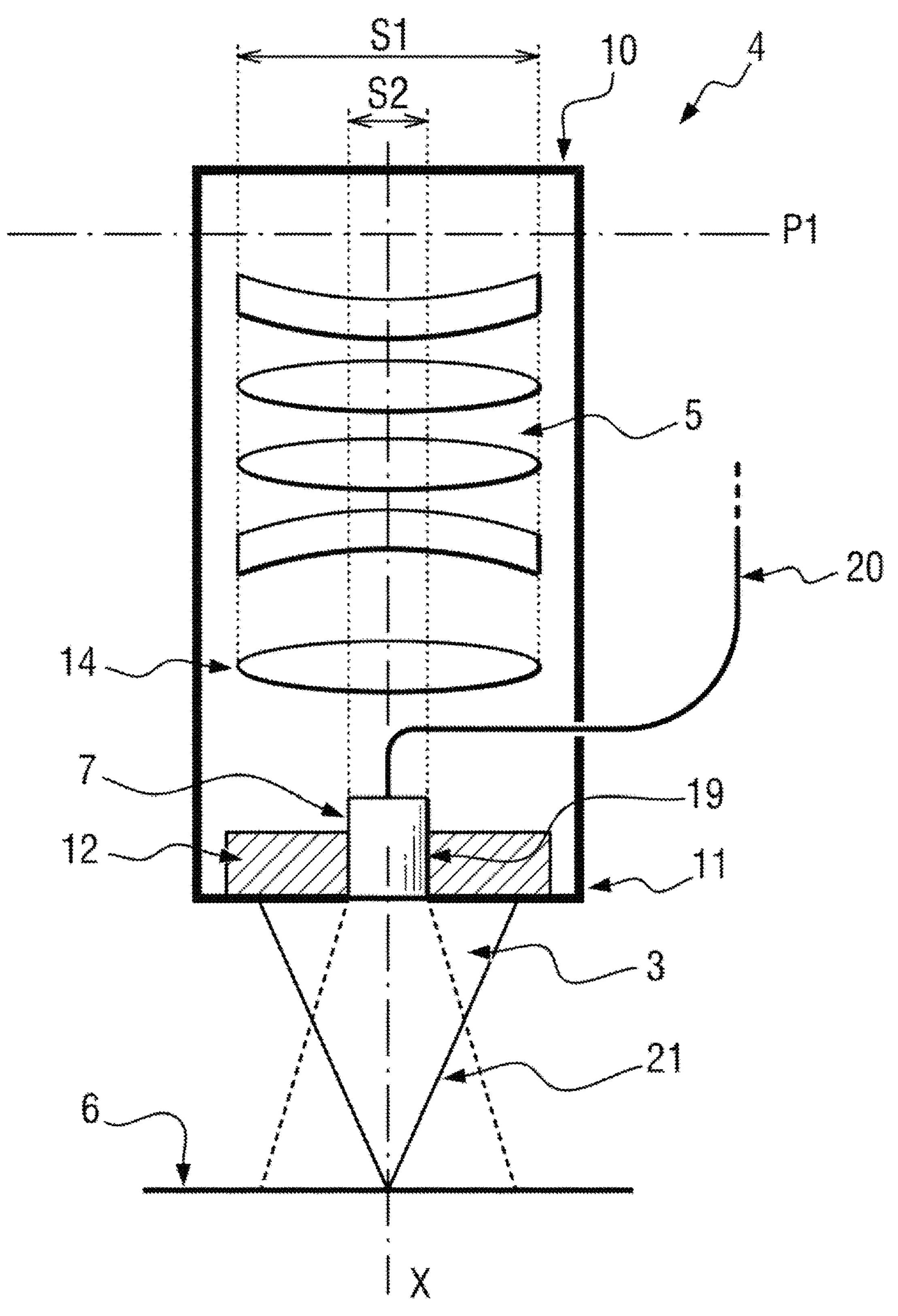
FIG. 1 is a schematic view of a first exemplary embodiment of a light pen of a measurement device according to an embodiment.

A chromatic confocal measurement device 1 comprises a light source 2 configured to generate a light beam 3, a light pen 4 comprising an objective with axial chromatism 5 configured to apply the light beam 3 on the surface 6 of the sample, and a camera 7. The measurement device 1 further comprises a spectral analysis system 8 such as a spectrograph 8 configured to determine a spectral distribution of the light beam 3 reflected after its passage through the light pen 4, as well as processing means 9 of the signal, enabling this spectral distribution to be analysed in order to calculate the axial position of the surface 6.

The light pen 4 has an input end 10 connected to the light source 2 and an output end 11 configured to be placed close to the surface 6 of the sample. The objective with axial chromatism 5 is housed in the light pen 4 and comprises a series of lenses having a known axial chromatism, which are disposed in the objective 5 such that their optical axes are coaxial. Where applicable, the light pen 4 can further comprise a window 12 (in other words a flat protective slide, devoid of chromatic aberrations) mounted at its output end 11, downstream of the objective with axial chromatism 5 ("upstream" and "downstream" being defined according to the direction of propagation of the light incident in the light pen 4), in other words between the objective 5 and the surface 6 of the sample.

The light source 2, the light pen 4 and the spectrograph 8 can be connected by means of at least one optical fibre 13. The light source 2 and the spectrograph 8 can be housed in an optronics enclosure, which can be connected to the light pen 4 by means of at least one optical fibre 13 and to the processing means 9 by a cable. Where applicable, the light pen 4 and/or the processing means 9 can likewise be housed in the optronics enclosure. It should be noted that, in this case, the optical fibre 13 is optional.

The light source 2 is configured to generate a light beam 3, that is preferably polychromatic (as opposed to a monochromatic light source 2 such as a laser). The use of a polychromatic light beam 3 makes it possible to carry out chromatic confocal measurements and, in particular, to have an axial chromatism along the axis of measurement, which makes it possible to measure a distance without any movement of the measurement device 1. The light source 2 can comprise, in particular, a white light, for example one or more light-emitting diodes.

Furthermore, the light beam 3 has a low (spatial and temporal) coherence, unlike a laser beam which is spatially and temporally coherent.

In a first embodiment, the measurement device 1 is a "point sensor" The light source 2 being polychromatic, the light pen 4 forms a set of monochromatic images of the light source 2 (or, more precisely, of the end of the optical fibre 13 which acts as a pinhole). These images define a straight-line observation segment in space, each image of the source being defined by its wavelength and its focal distance relative to the light pen 4. This same light pen 4 also collects the backscattered light beam 3 in order to form, on the end of the optical fibre 13 which acts as a spatial filtering hole, a common polychromatic image of all the monochromatic images. This polychromatic image is composed of the wavelengths of the various interfaces encountered by the light beam 3 in the sample.

The polychromatic image is then transmitted, via the optical fibre 13, to the spectrograph 8. The spectrum which is measured there then shows one or more peaks corresponding to the interfaces encountered by the light beam 3 when the sample is placed inside the space covered by the chromatism (i.e. the observation straight line segment). For example, if the sample comprises an opaque surface 6, there is only one wavelength of the light source 2 for which a clear image is obtained on the surface 6. The processing means 9 of the signal then make it possible to deduce the distance between the light pen 4 and the surface 6 on the basis of the wavelength identified by the spectrograph 8.

In a second embodiment, the measurement device 1 is a "line sensor" and enables the simultaneous measurement of a set of points aligned along a line. Unlike the point sensor, the line sensor comprises a series of optical fibres 13 configured to guide the light generated by the light source 2 to the input of the light pen 4 and its return from the light pen 4 to the spectrograph 8. More precisely, the end of these optical fibres 13 are spatially organised so as to define a lateral measurement field (in particular a line). In an embodiment, the light beams emitted by each of these optical fibres 13 then propagate in the light pen 4 via a separator to the surface 6, where they are dispersed along the optical axis. In a similar manner to the point sensor, each wavelength perfectly focused for each point of the lateral field is reflected by the surface 6 of the sample, propagates in the opposite direction in the light pen 4 and is guided, via the separator and the optical fibres 13, to the input of the spectrograph 8. The spectrograph 8 thus comprises a photodetector in order to visualise the spectra corresponding to each measurement point of the line.

In a third embodiment, the device is a "multipoint sensor". This is a sensor in which a plurality of light sources is disposed in an ordered manner, but not necessarily aligned as in the case of a line sensor. It can involve, for example, three points in a triangle, four points in a square or rectangle, N points distributed on a circle and, in general, N points distributed according to a geometric pattern. These source points can be the end of an optical fibre 13 each coming from a single-point controller, or the ends of the optical fibres bundles 13, in which the points are not necessarily aligned.

In order to visualise the surface 6 to be studied, and in particular the measurement point, the camera 7 is fixed close to the output end 11 of the light pen 4, between a portion downstream of the objective with axial chromatism 5 and the surface 6 of the sample, such that a portion of the light beam 3 originating from the light source 2 and emerging from the objective with axial chromatism 5 is blocked by the camera 7 at the output end 11 of the light pen 4, and such that another portion of the light beam 3 bypasses the camera 7 and reaches the surface 6 of the sample. The size of the camera 7 is therefore chosen such that it only partially blocks the light beam 3, in order not to prevent simultaneous measurement by the measurement device 1.

The camera 7 being placed in the downstream part of the objective with axial chromatism 5, the image obtained by the camera 7 is clear and is not deformed by the aberrations of the light pen 4 nor by the axial chromatism of the objective 5. Moreover, since the measurement device 1 operates on the principle of chromatic confocal coding, the partial blocking of the light beam 3 does not prevent the measurement and does not significantly degrade the performance of the measurement device 1. Quite the contrary, it appears that the partial blocking of the light beam 3 can reduce certain optical aberrations and improve the measurement precision on transparent objects having large thicknesses or very marked shapes (such as thick transparent tubes). Thus, the only effect of the presence of the camera 7 is to reduce the luminous intensity of the light beam 3, which does not prevent the performance of the measurement by the measurement device 1. Finally, the camera 7 being placed in the light beam 3 of the light pen 4, its field of vision 21 is optimally positioned relative to the measurement spot.

The camera 7 can be fixed in the light pen 4 or outside of the light pen 4, on its output end 11.

Figure 2:
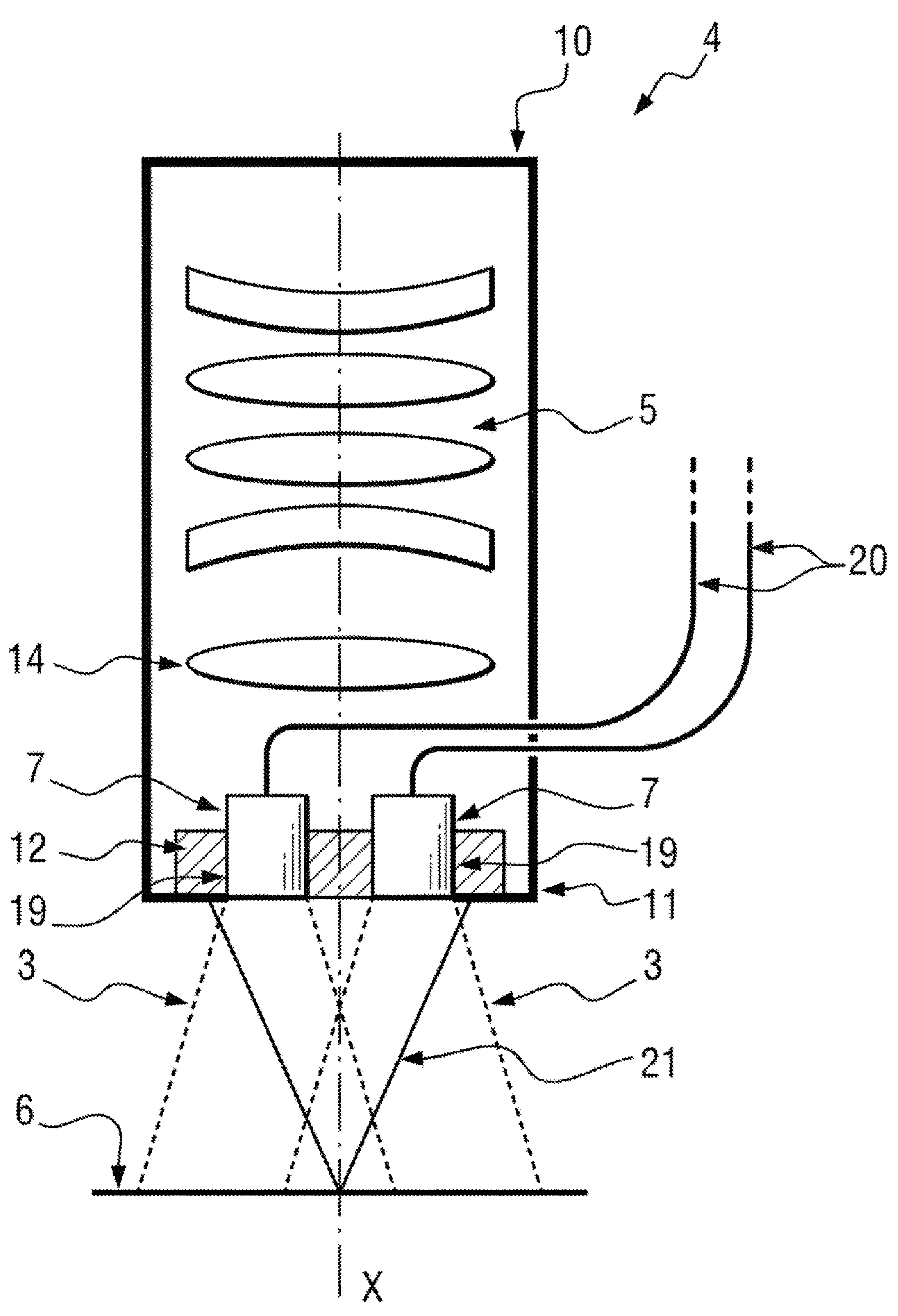
FIG. 2 is a schematic view of a second exemplary embodiment of a light pen of a measurement device according to an embodiment.
Figure 3:
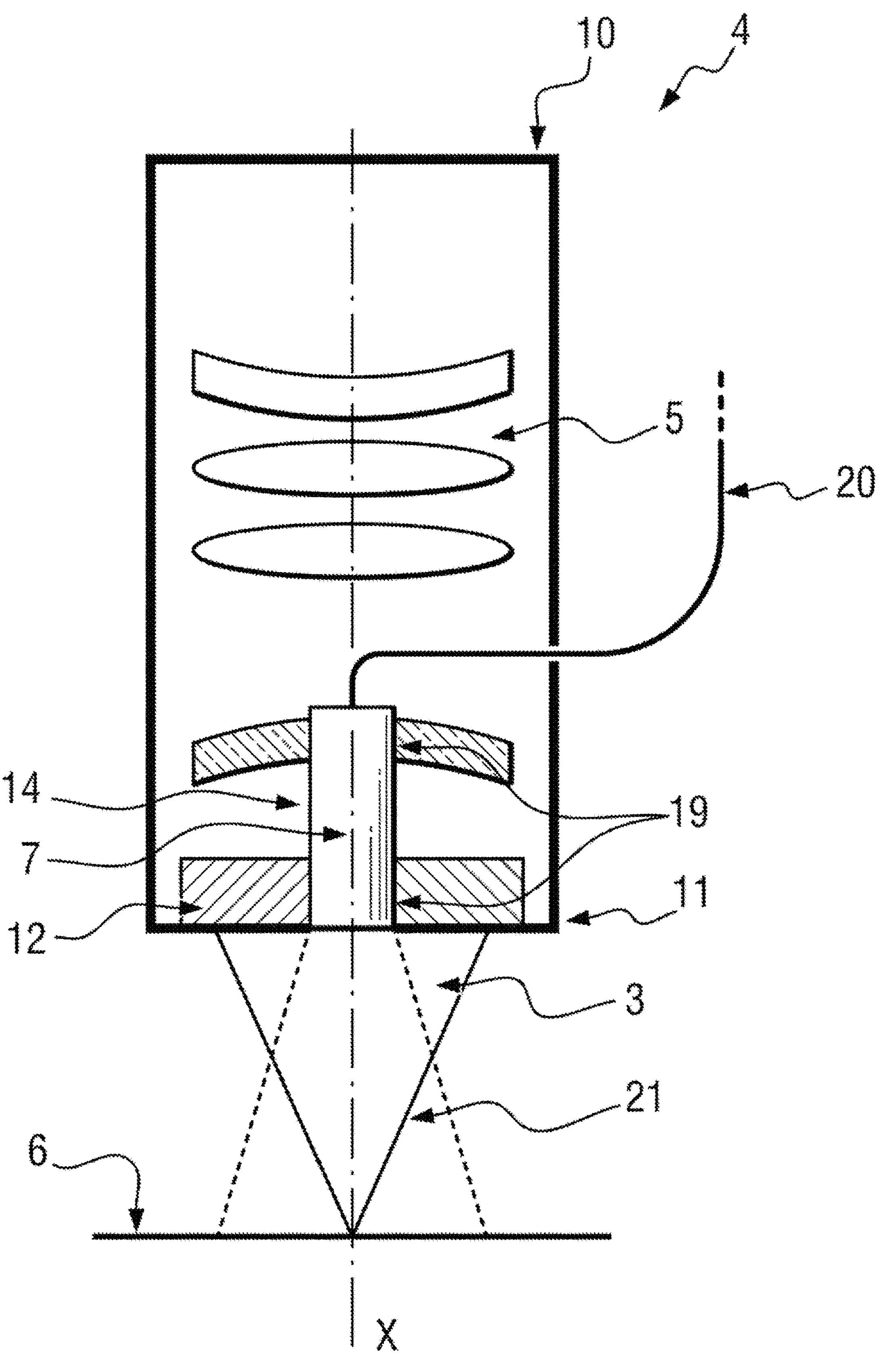
FIG. 3 is a schematic view of a third exemplary embodiment of a light pen of a measurement device according to an embodiment.
Figure 4:
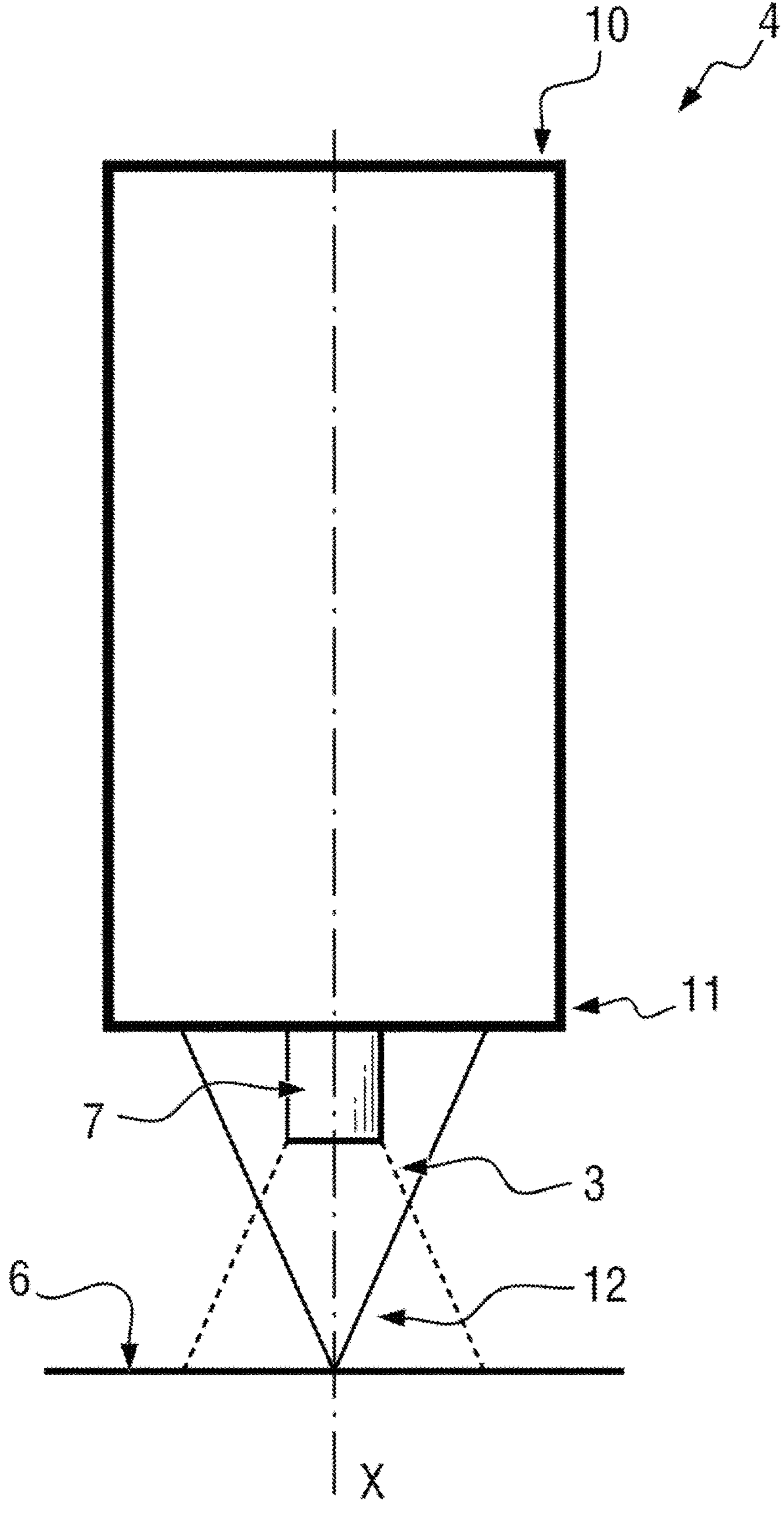
FIG. 4 is a schematic view of a fourth exemplary embodiment of a light pen of a measurement device according to an embodiment.
Figure 5:
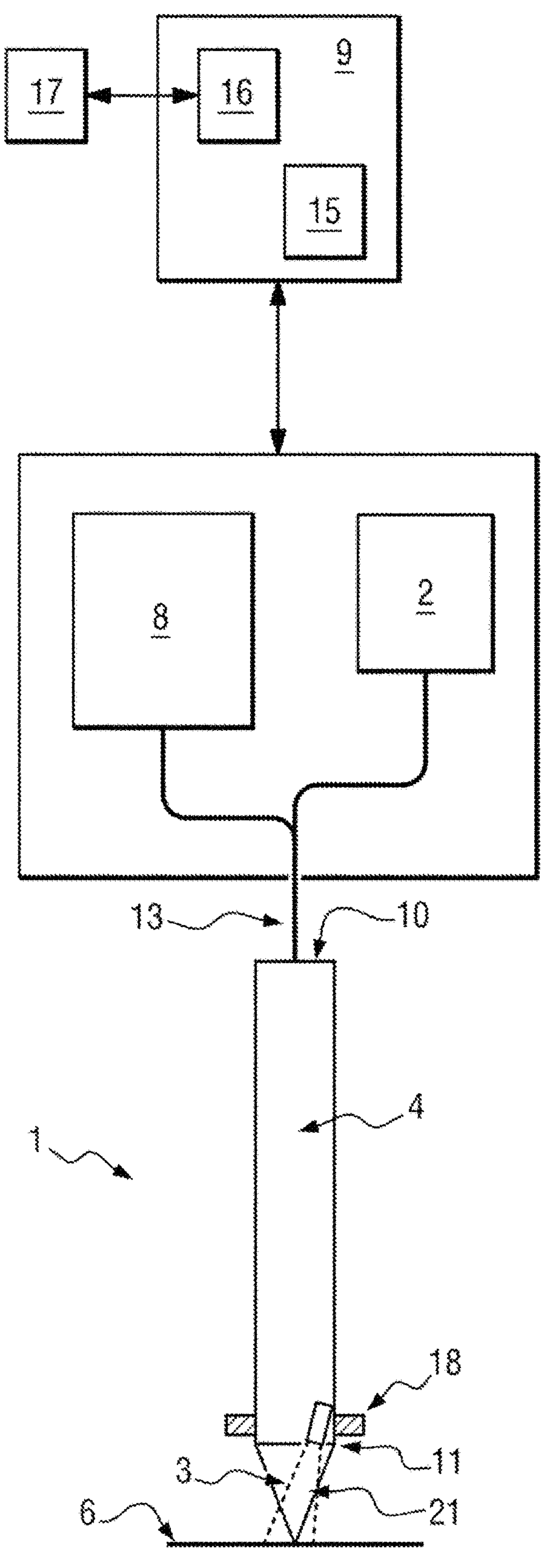
FIG. 5 illustrates, very schematically, a measurement device according to an embodiment and comprising a fifth example of a light pen.

The camera 7 can be centred on the axis of propagation X of the light beam 3 (FIGS. 1, 3 and 4). Alternatively, the camera 7 can be off-centre with respect to the axis of propagation X of the light beam 3 (FIG. 2) and, where applicable, be positioned such that its line of sight is tilted with respect to the axis of propagation X (FIG. 5).

In order not to block all the light beam 3 and to allow the performance of the measurement, the cross-section of the light beam 3 which is occupied by the camera 7 is less than the total cross-section of the light beam 3 emerging from the light pen 4. For this purpose, the area S1 (seen in cross-section in FIG. 1) of the lens 14 furthest downstream of the light pen 4, which may correspond to the lens 14 furthest downstream of the objective with axial chromatism 5 or to the window 12 of the light pen 4, is larger than the area of the camera 7. The term "area S1 of the lens 14" should be understood here as the orthogonal projection of the lens 14 in a first plane P1 that is perpendicular to the axis of propagation X of the light beam 3 through this lens 14. Similarly, the term "area S2 of the camera 7" should be understood here as the orthogonal projection of the camera 7 in this first plane P1.

The camera 7 itself is chosen such that its area S2 is less than that of the lens 14, preferably at least two times less, for example at least four times less, in order to limit the loss of light signal during the measurement.

The camera 7 can therefore be a miniature camera 7. This type of camera 7 is used, in particular, in the field of medical endoscopy. Typically, cameras 7 exist for which the area (in the sense of the definition given above) is between approximately 3.0 $mm^2$ and 30.0 $mm^2$ (i.e. a diameter between approximately 1.0 mm and approximately 3.1 mm if the camera 7 is substantially tubular).

An example of a camera 7 that is able to be used in the measurement device 1 is marketed by MIKROP, which uses an Ominivision sensor (reference OV6946) having the following features: resolution 400×400 pixels; optical size: 1/18"; progressive scan mode; frame rate 160 Kpixel (400×400): 30 fps; dimensions: 950 μm×940 μm. A camera 7 marketed by MIKROP which incorporates this sensor then comprises an objective having the following features: an opening between 5.80 and 6.40; a field of vision between 90° and 140°; a diameter of 1.50 mm; a length of 8.9 mm; a minimum working distance of 2 mm and a depth of field between 2 mm and 100 mm.

The use of miniature cameras 7 makes it possible to retain the conventional dimensions for the light pen 4 and the lenses of the objective with axial chromatism 5. In particular, it is not necessary to use lenses larger than those which are usually used in current chromatic confocal measurement devices. Typically, the lens 14 can have a diameter of order 3 mm to 10 mm in the low diameter devices. In general, the diameter of the lens 14 is preferably at least twice as large as that of the camera.

Preferably, the camera 7 has a depth of field suitable for enabling the production of clear images over the entire working range of the measurement device 1. This type of camera 7 is therefore generally devoid of a manual or automatic ("autofocus") focusing device. The working range of the measurement device 1 (covering all the distance measurements that can be performed by the measurement device 1) can be between 2 mm and 100 mm. The camera 7 is therefore chosen so as to have a depth of field covering at least the interval between 2 mm and 100 mm.

It should be noted that the device can comprise a plurality of cameras 7 fixed close to the output end 11 of the optical sensor (see for example FIG. 2) in order to obtain images from different points of view, or to obtain a stereoscopic vision enabling a three-dimensional image of the sample to be created. Each of the cameras 7 is then placed in the light beam 3 so as to partially block this beam, while allowing a portion of this beam to pass in order to reach the surface 6 of the sample. The sum of the areas S2 of the cameras 7 (as defined above) therefore remains less than the area S1 of the lens 14. Preferably, the sum of the areas S2 of the cameras 7 is less than half the area S1 of the lens 14, preferably a quarter of the area S1 of the lens 14.

In a first embodiment, the camera 7 is fixed on the output end 11 of the optical sensor.

For example, the light pen 4 can comprise an achromatic lens placed at the output end 11 of the light pen 4. The achromatic lens can, for example, correspond to the window 12 of the light pen 4. The camera 7 can then be fixed, for example by bonding, on one of the faces of the achromatic lens 12, for example the downstream face (output face of the incident beam) (see for example FIG. 4).

Alternatively, the camera 7 can be fixed on an achromatic lens which is attached and fixed on the output end 11 of the light pen 4, for example by screwing or snap-fitting.

This first embodiment has the advantage of being simple to produce and not imposing any modification of the light pen 4, apart from taking into account the possible addition of the achromatic lens (which has an impact on the optical path of the light beam 3) in the optical calculation carried out by the processing means 9. On the other hand, the placing of the camera 7 outside of the light pen 4 reduces the available working distance.

In a second embodiment, a through-passage 19 is formed in one of the lenses of the light pen 4 and the camera 7 is at least partially housed in the through-passage. The lens is therefore pierced in order to receive the camera 7, which enables the axial size of the measurement device 1 to be reduced and, in particular, does not impact on its working distance.

The lens which is pierced can correspond to the lens 14 furthest downstream of the objective with axial chromatism 5, in other words the last lens of the objective 5 which is closest to the output end 11 of the light pen 4. The choice of this lens 14 can avoid the objective with axial chromatism 5 deforming the image obtained by the camera 7.

Alternatively, the lens which is pierced can correspond to an achromatic lens placed downstream of the objective with axial chromatism 5, typically the window 12 of the light pen 4.

According to yet another alternative, both the lens 14 furthest downstream of the lens with axial chromatism 5 and an achromatic lens, typically the window 12, can be pierced in order to receive the camera 7.

In practice, the choice of the one or more pierced lenses 12, 14 depends on the configuration of the measurement device 1, the dimensions of the camera 7 in the direction of the axis of propagation X of the light beam 3 and the desired working distance. Indeed, when the distance between the lens 14 furthest downstream of the objective 5 and the window 12 is less than the length of the camera 7 and when it is desired to maximise the working distance, the lens 14 and the window 12 will be able to be pierced in order to integrally house the camera 7. On the other hand, when this distance is less than the length of the camera 7 or when the available working distance is adjustable, it is possible to only pierce the window 12. Finally, it is also possible to only pierce the lens 14 or the two lenses furthest downstream, when the light pen 4 has no window 12 or when the configuration of the objective 5 rated possible to house the camera 7 in these two downstream lenses.

It should be noted that the one or more lenses 12, 14 can also be pierced in order, where applicable, to allow the passage of cables 20 for power supply and/or data transmission from the camera 7 to the processing means 9. Alternatively, an orifice can be formed in the body of the light pen 4 in order to allow the exit of the one or more cables 20 from the camera 7 to the processing means 9.

The lens 12, 14 can be pierced by any known means, for example by optical coring, typically by diamond machining or even by trepanning.

The spectrograph 8 includes an optical sensor configured to measure a total energy (in J) of the light beam 3 reflected by the surface 6 of the sample through the projection objective 5 during an integration interval (in seconds). The signal processing means 9 comprises a processing unit 15, for example a computer or a server having processing means, suitable for executing the chromatic confocal measurement method. The processing unit 15 can comprise, for example, a memory in which code instructions are stored for the execution of the chromatic confocal measurement method and a computer of the processor, microprocessor, microcontroller type, etc. configured to execute these instructions. The equipment also comprises control means (touchscreen, keyboard, mouse, buttons, etc.).

The camera 7 can be connected, for example by a cable, to the processing means 9 or two dedicated processing means 9 The processing means 9 comprise, in particular, an acquisition system 16 configured to receive the images captured by the camera 7 and to display them on a display device 17, such as a screen, in order to allow a user to visualise, in real-time, the position of the measurement point on the surface 6.

In case where the camera 7 blocks a portion of the light beam 3, the measurement device 1 can further comprise a light 18 fixed on the light pen 4 and configured to illuminate the surface 6 of the sample. The illumination of the surface 6 of the sample makes it possible to improve the quality of the image, in particular when the ambient illumination is not sufficient or when the measurement device 1 masks the ambient illumination.

The light 18 can be incorporated in the camera 7. For example, the camera 7 can have a ring of light-emitting diodes mounted around its optic.

Alternatively, the light 18 can be attached and fixed on the light pen 4 close to the output end 11 (see FIG. 5). For example, the measurement device 1 can comprise an annular ring comprising light-emitting diodes which is attached and fixed around its output end 11.

It should be noted that the optical principle of the chromatic confocal microscope is by nature insensitive to ambient light. In particular, the measurement precision and the sensitivity of the measurement device 1 are generally not affected by the presence of the illumination of the light 18. The measurement device 1 can therefore be used normally without being disturbed by the illumination.

Where applicable, when the surface 6 to be measured is very reflective, the presence of the light 18 can possibly disturb the measurement. In this case, the processing unit can be configured so as to modulate the illumination of the light 18 (in particular when it comprises light-emitting diodes which can be addressed) in order to synchronise the measurement and the illumination by offsetting them in time.

The invention claimed is:

1. A chromatic confocal measurement device comprising:
- a light source configured to generate a light beam;
- a light pen comprising an objective with axial chromatism configured to apply the light beam on a surface of the sample, the light pen having an input end connected to the light source and an output end configured to be placed close to the surface of the sample; and
- a camera positioned between the objective with axial chromatism and the surface of the sample such that a portion of the light beam originating from the light source and emerging from the objective with axial chromatism is blocked by the camera at the output end of the light pen and another portion of the light beam is not blocked by the camera and reaches the surface of the sample.

2. The measurement device according to claim 1, wherein the light pen comprises a lens placed close to the output end of the light pen, a first area being larger than a second area, wherein the first area corresponding to an orthogonal projection of the lens in a first plane which is perpendicular to an axis of propagation of the light beam through the lens and the second area corresponds to an orthogonal projection of the camera in the first plane, such that the camera only partially blocks the optical field of the lens.

3. The measurement device according to claim 2, wherein the first area is at least twice larger than the second area.

4. The measurement device according to claim 2, wherein the camera is at least partially housed a through-passage of the lens.

5. The measurement device according to claim 2, wherein the lens has an axial chromatism and forms part of the objective with axial chromatism.

6. The measurement device according to claim 2, wherein the lens is achromatic and is placed between the objective with axial chromatism and the camera, the camera being at least partially housed in a through-passage of the lens.

7. The measurement device according to claim 2, wherein the first area is at least four times larger than the second area.

8. The measurement device according to claim 1, wherein the camera is placed between the light pen and the surface to be measured.

9. The measurement device according to claim 1, further comprising an additional camera positioned between the lens with axial chromatism and the surface of the sample such that a portion of the light beam originating from the light source and emerging from the objective with axial chromatism is also blocked by the additional camera at the output end of the light pen and the other portion of the light beam also bypasses the additional camera and reaches the surface of the sample.

10. The measurement device according to claim 1, wherein a depth of field of the camera is between 2 mm and 100 mm.

11. The measurement device according to claim 1, further comprising a light fixed on the measurement device and configured to illuminate the surface of the sample.

12. The measurement device according to claim 11, wherein the light is incorporated to the camera or is attached and fixed on the light pen close to the output end.

13. The measurement device according to claim 1, further comprising a spectral analysis system configured for determining a spectral distribution of the light beam reflected by the surface of the sample.

* * * * *